United States Patent
Hoegee

[15] 3,674,075
[45] July 4, 1972

[54] TAMPER-PROOF TWO-WAY LOCKING NUT

[72] Inventor: Robert A. Hoegee, Huntington Beach, Calif.

[73] Assignee: Shur-Lok Corporation, Santa Ana, Calif.

[22] Filed: Nov. 14, 1969

[21] Appl. No.: 876,760

[52] U.S. Cl. ..............................151/21 B, 85/32 R, 85/45, 151/63

[51] Int. Cl. .............F16b 23/00, F16b 29/00, F16b 37/00, F16b 39/284

[58] Field of Search ............151/21 B, 63, 66; 85/45, 32; 10/86 A, 86; 85/61

[56] References Cited

UNITED STATES PATENTS

| 3,103,962 | 9/1963 | Neuschotz | 151/21 B X |
| 471,608 | 3/1892 | Gould | 151/63 X |
| 1,792,711 | 2/1931 | Rockstad | 85/32 |
| 1,956,963 | 5/1934 | Salmen | 85/45 |
| 2,538,350 | 1/1951 | Baule | 85/45 |
| 3,222,976 | 12/1965 | Holman | 85/35 X |
| 3,282,015 | 11/1966 | Rohe et al. | 85/32 X |

*Primary Examiner*—Ramon S. Britts
*Attorney*—Lynn H. Latta

[57] ABSTRACT

An all-metal conical nut having coined locking depressions at the intersections of a pair of external wrenching grooves parallel to the nut axis and an annular groove midway between the ends of the nut, which can be threaded onto the end of a threaded rod end either base-first or tip-first, the latter facilitating its application to a control rod end bearing before insertion of the latter into a control rod.

5 Claims, 5 Drawing Figures

PATENTED JUL 4 1972   3,674,075
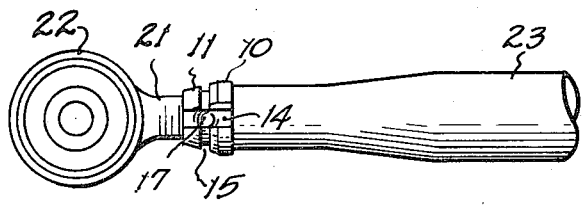
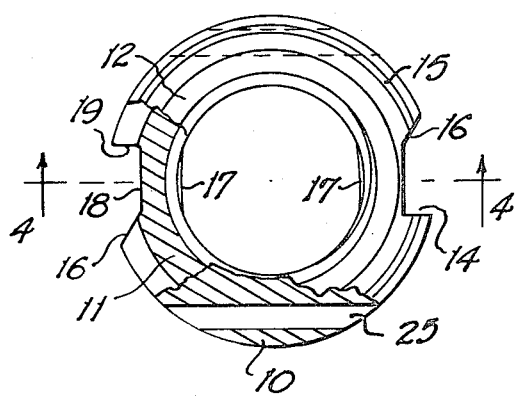
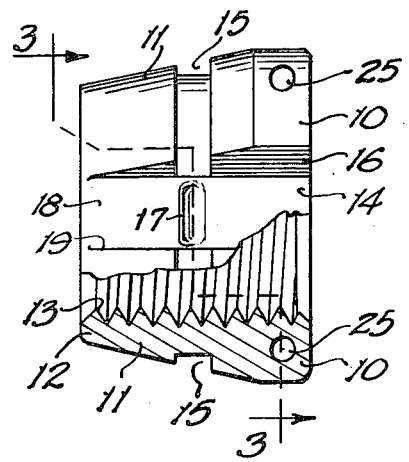
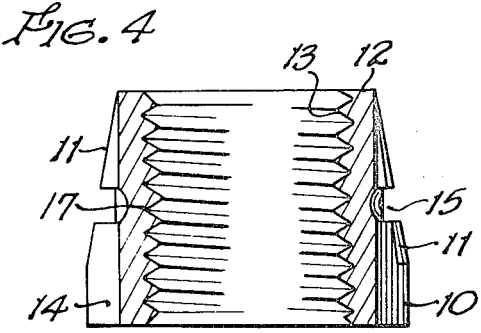
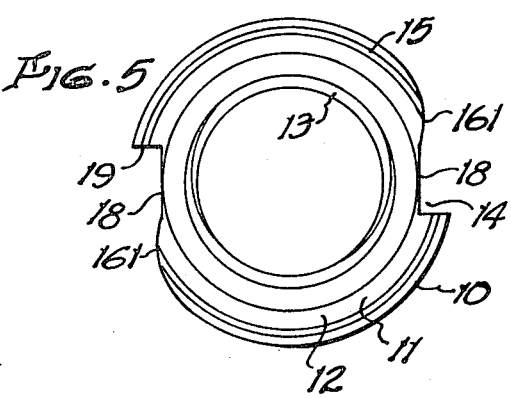
INVENTOR.
ROBERT A. HOEGER
BY
Lynn H. Latta
—ATTORNEY—

TAMPER-PROOF TWO-WAY LOCKING NUT

BACKGROUND OF THE INVENTION

Conical nuts of various specific configurations have been generally used and disclosed heretofore in the art as, for example, in Schaeffer U.S. Pat. No. 2,307,080 and Rohe British Pat. No. 812,540. Circular nuts having lateral notches for engagement by a spanner wrench are well known in the art as exemplified by Chambers U.S. Pat. No. 2,202,044. This patent and the above mentioned British patent also disclose locking features of an insert type (radial plug or annular collar of hard plastic material). Nuts having thread deformations providing for locking, are also old in the art as shown for example in Rohe U.S. Pat. No. 3,417,803.

SUMMARY OF THE INVENTION

This invention provides an all-metal locking nut requiring special tools for installation and removal so as to discourage tampering and prevent adjustment which would affect the preload established on the nut during installation. The nut is basically of a conical shape with parallel lateral grooves to receive the nibs of a spanner wrench and with an annular groove midway between the ends of the nut, locking depressions being coined in the bottom of the annular groove at the intersections with the lateral grooves. One side of each lateral groove can be chamfered away to prevent removal of the nut once it is installed.

DESCRIPTION

A general object of the invention is to provide a tamper-proof nut of simple and inexpensive construction. Another object is to provide such a nut requiring a special spanner wrench for installation. Another object is to provide such a nut having a pair of thread locking deformations so positioned as to facilitate installation of the nut either base-first or backward thereto. Another object is to provide a deformed thread locking feature of especially effective construction, so located as to minimize interference with forward or backward installation. A further object is to provide a locking nut having diametrically opposed thread deformations applied so as to minimize permanent deformation of the nut from circular to oval circumferential configuration.

These and other objects will become apparent in the following specifications and appended drawings, in which:

FIG. 1 is a side view of a portion of a control rod having the nut of this invention installed thereon as a lock nut;

FIG. 2 is a side view thereof with a portion shown in section;

FIG. 3 is an end view thereof, with portions thereof broken away and shown in section in several planes as indicated by line 3—3 of FIG. 2;

FIG. 4 is an axial sectional view thereof taken on line 4—4 of FIG. 3; and

FIG. 5 is an end view of a modified form of the invention.

Referring now to FIGS. 1-4 of the drawing in detail, I have shown therein, as an example of one form in which the invention may be embodied, a nut having a cylindrical base section 10, a conical body 11 narrowing to minimum thickness at its tip 12, an internal thread 13, a pair of diametrically opposed spanner wrench slots 14 extending parallel to the nut axis, an annular coining groove 15 substantially midway between the ends of the nut, and thread lock deformations 17 at the intersections of the slots 14 with annular groove 15. One side of each slot 14 is chamfered at 16 to prevent removal of the nut, by gripping engagement therewith by a spanner wrench, and the other side 19 of each slot is at right angles to the bottom 18 of the slot to provide generally radial wrenching shoulders 19 for gripping engagement by a spanner wrench to install the nut. The chamfers 16 may subtend angles of about 150° to the bottoms 18. The nut can be installed backward on the threaded shank 21 of a control rod end bearing 22, using a spanner wrench or other suitable wrench, and the nut can then be tightened against the end of the control rod 23 after threading the rod end 21 into the control rod, the tightening being done by a special spanner wrench. Any attempt to use the same spanner wrench or other wrench to remove the nut after it has been locked against the end of the control rod 23, will fail due to the slope of the chamfers 16. Thus the nut is effectively locked to the control rod, relatively safe from tampering.

The thread deformation 17, in circumferential configuration, are oval sections of the threads 13 at the bottom of groove 15. They are formed by application of pressure inwardly against the bottom of groove 15 along radii at right angles to the bottoms 18 of wrenching slots 14. The nut wall at points 90° removed from the slots 14 is at substantially maximum strength, and this makes it possible to avoid permanent deformation of the nut wall as a whole to oval form, which would render the nut useless. The deformations 17 are therefore restricted to the local areas at the intersections of annular groove 15 with slots 14.

Since the nut body retains true circular cross-section throughout its length except in the localized thread lock areas 17 which do not extend axially beyond the limits of annular groove 15, and since the threads in the respective ends of the threaded bore have substantial extent beyond the groove 15 at both ends of the nut, the thread deformations at the intersections of groove 15 with wrenching slots 14, will not interfere with starting of the nut onto a threaded rod or shank either base-first or tip-first. Thus the nut can easily be installed backwards on the shank 21.

As shown in FIG. 5, instead of the chamfers 16 the walls of slots 14 at one side may be faired at 161 with a spiral configuration, e.g., on a radius eccentric to the nut axis, so as to make the removal of the nut even more difficult.

Preferably, the cylindrical base 10 of the nut is provided with lockwire bores 25 disposed chordally therein, parallel to the diameter on which wrenching slots 14 are centered. The bores 25 can be used to receive NAS513 or NAS1193 locking wire hardware, as a double safety feature.

I claim:

1. A locknut comprising:
   an annular conical nut body having a relatively thick base and a relatively thin tip;
   female threads within said body, extending substantially from end to end thereof;
   a generally radial wrenching shoulder provided by one side of a slot extending generally parallel to the nut axis in the side of the nut; the alternate side of said slot being defined by a chamfer;
   said slot having a chordal bottom parallel to the nut axis; said bottom and chamfer subtending a dihedral angle, to prevent rotation of the nut by a spanner wrench in a back-off direction;
   said nut body having an external circumferential groove encircling it substantially midway between its ends and intersecting said slot; the bottom of said groove being at a distance no less than the radial distance of the bottom of said slot from the nut axis;
   and a thread lock comprising a radially inwardly deformed portion of a web of the nut body wall defining the bottom of said slot in the intersection of said groove and slot;
   the remainder of the wall of said nut body and the threads of both ends thereof beyond said circumferential groove, retaining a true circular cross-section;
   said nut body having respective end portions of substantially equal length extending axially from both sides of said circumferential grooves;
   the said locations of said circumferential groove and thread lock and the true circular cross sections adapting said nut for easily threading it onto a complementary threaded member either base-first or tip-first.

2. A locknut as defined in claim 1, wherein there are two of said slots in diametrically opposite positions, said slots having respective wrenching shoulders facing in a common circumferential direction.

3. A locknut as defined in claim 1;

said slot bottom being closer to the nut axis than said groove bottom and said web being correspondingly thinner than the web defining the bottom of said groove.

4. A locknut as defined in claim 3;
said slot being wider than said groove.

5. A locknut as defined in claim 1, said chamfer being of spiral curvature in a circumferential direction.

* * * * *